E. BOAS.
ENGINE CROSSHEAD.
APPLICATION FILED DEC. 14, 1918.
1,332,317.
Patented Mar. 2, 1920.
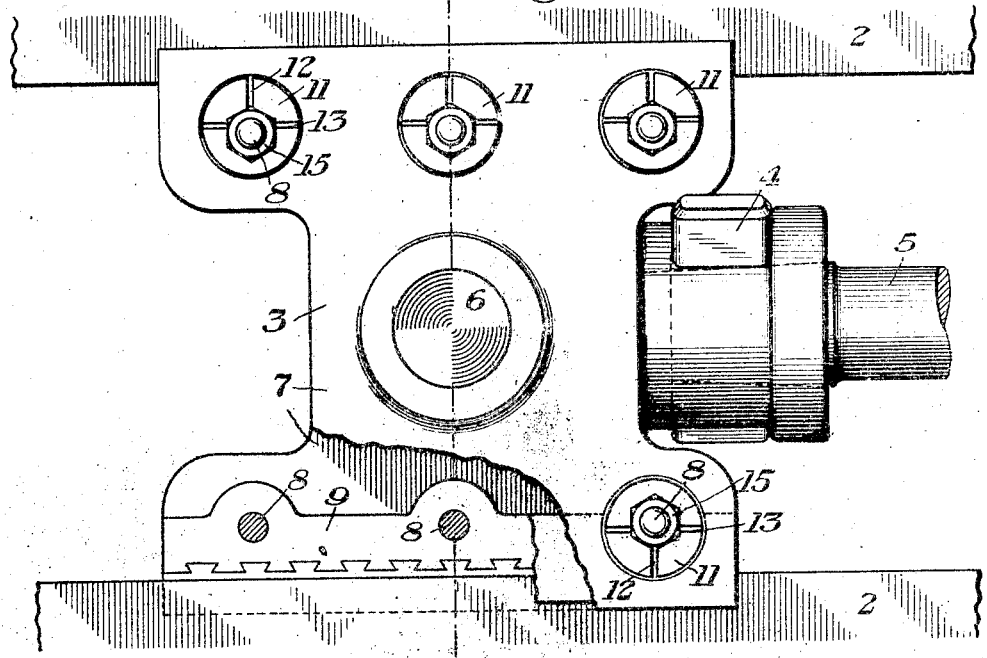
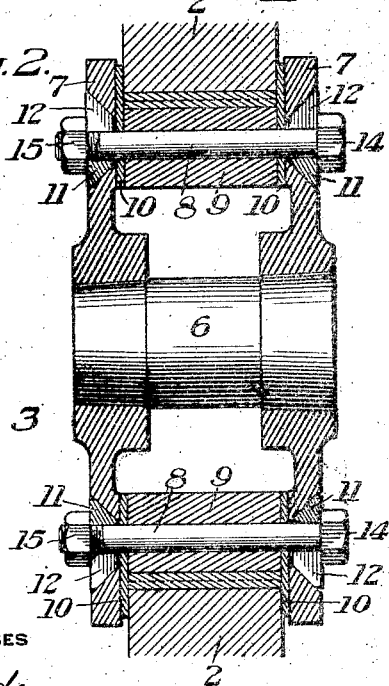
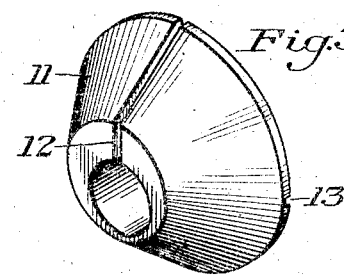
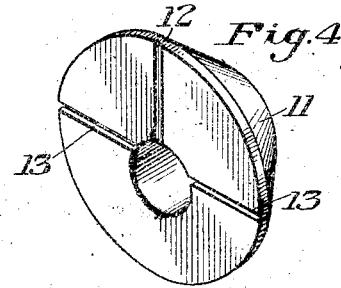
WITNESSES
INVENTOR
Edward Boas

UNITED STATES PATENT OFFICE.

EDWARD BOAS, OF INDIANAPOLIS, INDIANA.

ENGINE-CROSSHEAD.

1,332,317.

Specification of Letters Patent.  Patented Mar. 2, 1920.

Application filed December 14, 1918. Serial No. 266,738.

*To all whom it may concern:*

Be it known that I, EDWARD BOAS, a citizen of the United States, residing at Indianapolis, in the county of Marion and State of Indiana, have invented a new and useful Improvement in Engine-Crossheads, of which the following is a full, clear, and exact description, reference being had to the accompanying drawings, forming part of this specification.

Figure 1 is a side elevation of one form of engine cross head with parts broken away and in which I have shown one form of my improved cross head shoe adjusting devices.

Fig. 2 is a sectional view on the line II—II of Fig. 1, and Figs. 3 and 4 are perspective views of one of the conical washers for adjusting the shoes.

This invention relates to an improvement in engine cross heads and more particularly to adjusting devices for the cross head shoes and is designed to provide efficient means whereby one portion of the shoe may readily and quickly be adjusted with relation to another portion thereof without removing any of the parts.

A still further object of my invention is to provide an adjusting device of this character with locking means for locking the securing bolts or nuts with relation to the shoes and cross head.

The precise nature of my invention will be best understood by reference to the accompanying drawings which will now be described, it being premised, however, that changes may be made in the details of construction and the general arrangement of the parts without departing from the spirit and scope of my invention as defined in the appended claims.

In the drawings the reference character 2 designates the usual guides for an engine cross head such as 3. Connected to the cross head 3 by means of the usual pin 4 is a piston rod 5, and 6 is a wrist pin for connecting the usual pitman or connecting rod to the cross head. The cross head 3 is provided with side plates 7 formed integral therewith, and secured between these plates by means of bolts 8 are the cross head shoes 9 and the liners 10. One of the surfaces of each of the shoes 9 engages one surface of a guide 2 while one portion of one face of each of the liners 10 engages the side faces of one of the guides 2 in the usual manner. The shoes 9 are each provided with three cylindrical openings for the reception of the bolts 8, which bolts also pass through similar openings in the liners 10. These bolts also extend through conical openings in the side plates 7, and seated in each conical opening and surrounding the bolts are conical washers 11. These conical washers are provided with a cylindrical opening for the bolt, and which opening is eccentric to the periphery. Each washer is slotted at the thickest portion as indicated at 12 and the outer face of each washer is provided with a slot or slots 13 for the reception of a tool for rotating the washer with respect to the bolt. Each bolt 8 is provided with a head 14 which is arranged to seat against one of the washers on a bolt, while the other end thereof is provided with a nut 15 which engages the other washer.

In the drawings I have shown the various washers in the positions they occupy when the parts are first assembled, and in which allowance has been made for the maximum amount of wear of the guides. When either of the shoes became slightly worn the various nuts 15 are slightly loosened in order to permit the washers 11 to be rotated within their conical seats, and as each washer can be adjusted with relation to its bolt the shoes can readily be adjusted so that the maximum surface will engage the guides 2, as it will readily be appreciated from the drawings that either end or side of either of the shoes can be adjusted with relation to the other end or side thereof, or one shoe can be adjusted with relation to the other shoe in order to adjust the cross head with relation to the piston rod.

The advantages of my invention result from the provision of an engine cross head having adjustable shoes, together with means for adjusting one shoe relative to the other or for adjusting one portion of one shoe with relation to another portion thereof.

By slotting the conical washer I am enabled to force the washers into their seats so that the washers will not only act as adjusting devices for the shoes, but will also act as locking devices for the bolts and nuts.

I claim:

1. An engine cross head having a shoe arranged to engage a cross head guide, a plurality of bolts for securing the shoe to the cross head, and means on each end of each bolt for adjusting the shoe with relation to the cross head; substantially as described.

2. An engine cross-head having a shoe arranged to engage a guide for the cross-head, a device for securing the shoe to the cross-head, and means on said securing device for adjusting one side of the shoe with relation to the other side thereof, and also with relation to the cross-head, substantially as described.

3. An engine cross head having a shoe arranged to engage the cross head guide, a plurality of bolts for securing the shoe to the cross head, and a plurality of eccentric washers on each bolt for adjusting the position of the shoe with relation to the cross head; substantially as described.

4. An engine cross head having shoes arranged to engage the cross head guides, a plurality of bolts for securing each shoe to the cross head, conical seats in the cross head through which the bolts extend, and a conical washer in each of said seats surrounding a bolt for adjusting the shoe with relation to the cross head; substantially as described.

5. An engine cross head having shoes arranged to engage the cross head guides, a plurality of bolts for securing each shoe to the cross head, conical seats in the cross head through which the bolts extend, and a conical split washer in each of said seats and surrounding a bolt for adjusting the shoe with relation to the cross head and also to act as locking devices for the bolts; substantially as described.

In testimony whereof, I have hereunto set my hand.

EDWARD BOAS.